(12) United States Patent
Thiem et al.

(10) Patent No.: US 6,719,910 B1
(45) Date of Patent: Apr. 13, 2004

(54) STORMWATER TREATMENT SYSTEM

(75) Inventors: Leon Thiem, Kingston, RI (US); Rhett Grant, Townsend, MA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 160 days.

(21) Appl. No.: 09/892,600

(22) Filed: Jun. 27, 2001

Related U.S. Application Data

(60) Provisional application No. 60/214,625, filed on Jun. 28, 2000.

(51) Int. Cl.⁷ ............................. B01D 21/00; C02F 1/52
(52) U.S. Cl. ..................... 210/702; 210/266; 210/290
(58) Field of Search ..................... 210/660, 679, 210/689–694, 163, 164, 290–293, 702, 266, 283

(56) References Cited

U.S. PATENT DOCUMENTS

| | | |
|---|---|---|
| 3,674,687 A | 7/1972 | Quase |
| 5,133,619 A | 7/1992 | Murfee et al. |
| 5,223,154 A | 6/1993 | MacPherson, Jr. et al. |
| 5,232,587 A | 8/1993 | Hegemier et al. |
| 5,264,134 A | 11/1993 | McCamy et al. |
| 5,294,337 A | 3/1994 | Johnson |
| 5,296,293 A | 3/1994 | Jobst |
| 5,297,367 A | 3/1994 | Sainz |
| 5,316,589 A | 5/1994 | Krieger, Jr. |
| 5,322,629 A | 6/1994 | Stewart |
| 5,330,651 A | 7/1994 | Robertson et al. |
| 5,364,535 A | 11/1994 | Buckalew |
| 5,372,714 A | 12/1994 | Logue, Jr. |
| 5,391,295 A | 2/1995 | Wilcox et al. |
| 5,419,838 A | 5/1995 | DiTullio |
| 5,437,786 A | 8/1995 | Horsley et al. |
| 5,511,904 A * | 4/1996 | Van Egmond ............... 405/52 |
| 5,573,349 A | 11/1996 | Paoluccio |
| 5,593,481 A | 1/1997 | Redner |
| 5,624,552 A | 4/1997 | Vales et al. |
| 5,624,576 A | 4/1997 | Lenhart et al. |
| 5,632,889 A | 5/1997 | Tharp |
| 5,707,527 A | 1/1998 | Knutson et al. |
| 5,820,762 A * | 10/1998 | Bamer et al. ............... 210/661 |
| 5,849,198 A * | 12/1998 | Sharpless .................... 210/693 |
| 6,042,731 A * | 3/2000 | Bonnin ........................ 210/679 |
| 2002/0053259 A1 * | 5/2002 | Ma et al. ...................... 75/712 |

OTHER PUBLICATIONS www.epa.gov/waterscience/standards/about/crit.htm.*
http://filters–gbs.com/bonifibers__h.htm.*
http://tess2.uspto.gov/bin/showfield?f=doc&state= 4m75qp.2.1.*

* cited by examiner

*Primary Examiner*—Chester T. Barry
(74) *Attorney, Agent, or Firm*—Gauthier & Connors

(57) ABSTRACT

A stormwater treatment system which comprises a housing having a first filter layer and a second filter layer positioned within the housing. The first filter layer absorbs contaminants from stormwater to produce a first treated stormwater having an effluent concentration that meets the USEPA Water Quality Criteria when stormwater permeates the first layer. The second filter layer precipitates substantially all of the dissolved contaminants remaining in the first treated stormwater when the first treated storm water permeates through the second filter layer.

10 Claims, 2 Drawing Sheets

STORMWATER TREATMENT SYSTEM

CROSS-REFERENCE TO RELATED APPLICATIONS

This application claims the benefit of U.S. Provisional Application No. 60/214,625, filed on Jun. 28, 2000.

BACKGROUND OF THE INVENTION

1. Field of the Invention

This invention relates to a system and method for extracting contaminants from stormwater runoff.

2. Description of the Related Art

Highway stormwater runoff enters coastal area waterways and is a major contributor to the degradation of marine environments. The U.S. Environmental Protection Agency (USEPA) is now mandating coastal States and communities to develop regulations consistent with the Federal Coastal Zone Reauthorization Act (CZRA) to curb the degradation of coastal waters caused by stormwater pollution. The USEPA is phasing in new Water Quality Standards that will require states to impose Total Maximum Daily Levels (TMDL's) on the dissolved portion of toxic metals. According to the National Transportation Research Board, heavy metals, i.e copper, lead and zinc, are typically found in most highway runoff areas. Metals speciation is very complex and requires a complete understanding of the adsorption and dissolution qualities of the metals typically found in highway runoff. Metals are known to adsorb to the very fine particulates, i.e silt size or smaller, and are not typically captured by traditional or the second-generation oil/sediment separators. Approximately 60 to 70% of the metals typically found in highway runoff are in the particulate form. However, these metals adsorb to the very fine particulates, i.e particulates less than 60 microns. Most existing second generation oil/sediment separators, such as non-vegetative BMP's, are not designed to remove either silt size particulates or the dissolved portion of metals. At best, the existing prior second generation oil/sediment separators treat about 25% of the total concentration of metals. The present invention addresses this problem by providing a cost-effective system that removes not only the large particulates but also the dissolved fractions of toxic material associated with highway runoff.

BRIEF SUMMARY OF THE INVENTION

Broadly, the invention comprises a stormwater treatment system that efficiently removes contaminants from stormwater. The system comprises a housing having a first aperture positioned upstream of a second aperture. A first filter layer and a second filter layer are positioned within the housing and a separator layer is disposed between the first and second filter layers. Stormwater flows through the first aperture and permeates through the first layer. The first layer absorbs contaminants from the stormwater to produce a first treated stormwater having an effluent concentration that meets the USEPA Water Quality Criteria The first treated stormwater flows through the separator layer, into the second filter layer and permeates through the second filter layer. The pH of the second filter layer is controlled to precipitate substantially all of the dissolved contaminants remaining in the first treated stormwater to produce a second treated stormwater. The second treated stormwater flows out of the housing through the second aperture. The second aperture can be connected to an outlet pipe.

In a preferred embodiment of the invention, the fist filter layer is comprised of granular activated carbon and the second layer comprises crushed concrete, the main component of which is calcium oxide (CaO). The separator layer is a porous membrane, preferably a geosynthetic filter fabric. The separator layer separates the first and second filter layers in order to prevent the mixing of the materials which comprise the filter layers. Further, the separator layer provides support for the first filter layer. Examples of contaminants that the first and second layers remove from the stormwater include phosphorous, cadmium, chromium, copper, lead and zinc.

In another embodiment of the invention the second filter layer comprises crushed concrete, a building material well known to one skilled in the art, e.g. Portland Concrete, having an effective amount of CaO therein to control the pH of the second filter layer within a range of between about 9–11, preferably 10, thereby precipitating substantially all of the dissolved contaminants remaining in the first treated stormwater.

The invention also comprises a method for treating stormwater which comprises permeating stormwater runoff through a first medium to produce a first treated stormwater having an effluent concentration that meets the USEPA Water Quality Criteria and flowing the first treated stormwater through a second medium having a pH within a range of between about 9–11, preferably 10, to precipitate substantially all of the dissolved contaminants remaining in the first treated stormwater.

In a preferred embodiment of the method, the first medium is comprised of granulated activated carbon and the second medium comprises crushed concrete, the main component of which is CaO. The method further comprises flowing the first treated stormwater through a separator layer. The separator layer can be comprised of a porous membrane.

BRIEF DESCRIPTION OF THE DRAWING(S)

DESCRIPTION OF THE PREFERRED EMBODIMENT(S)

Figure 1:
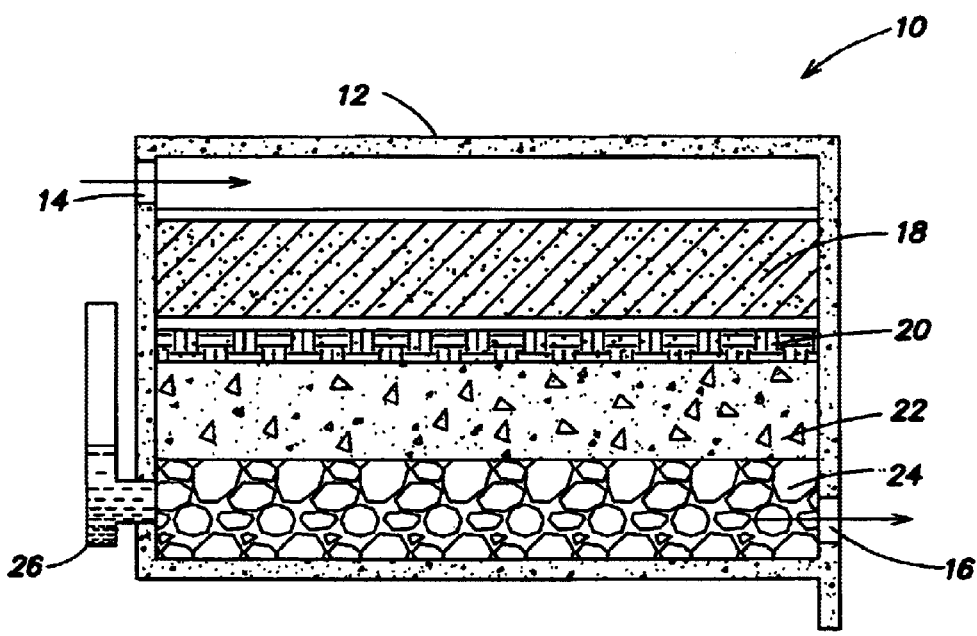
FIG. 1 is cross-sectional view of an embodiment of the stormwater treatment system.
Figure 2:
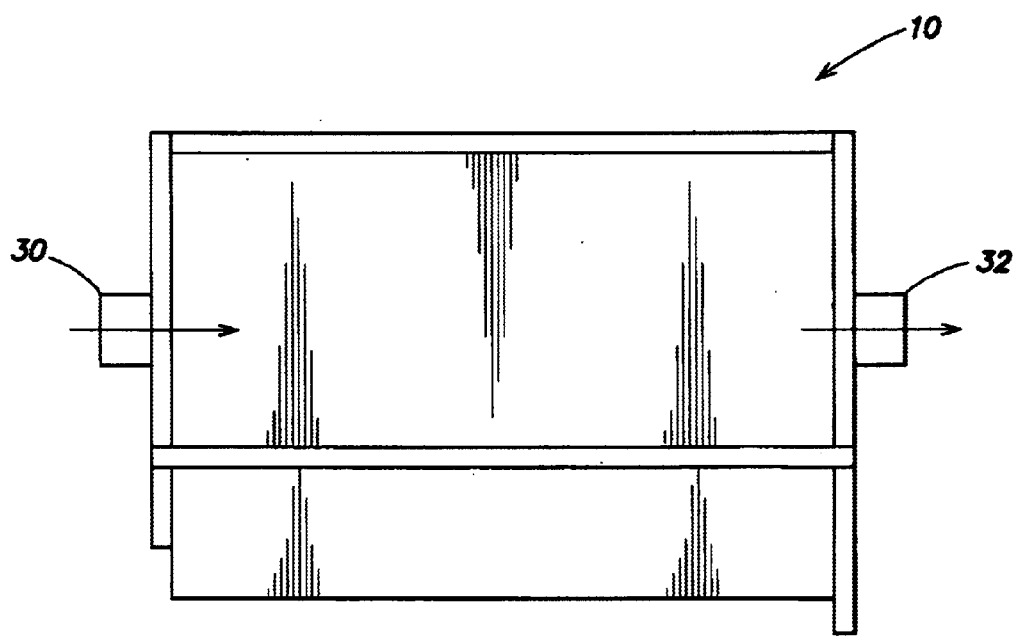
FIG. 2 is a top view of an embodiment of the stormwater treatment system.

Referring to FIGS. 1 and 2, the stormwater treatment system 10 is generally shown. Stormwater that is to be treated enters a housing 12 through a first aperture 14 from an inflow pipe 30. The housing 12 can be comprised of concrete. The stormwater permeates a first filter layer 18 which comprises a 16-inch bed of granular activated carbon that is able to absorb all investigated contaminants, e.g. phosphorus, cadmium, lead, zinc, copper and chromium, to an extent that effluent concentrations are low, e.g. phosphorus—0.01 mg/l, cadmium—0.0008 mg/l, chromium (+6)—0.015 mg/l, copper 0.005 mg/l, lead—0.015 mg/l, zinc—0.035 mg/l, and will meet the United States Environmental Protection Agency (USEPA) Water Quality Criteria The permeation of the stormwater through the first filter layer 18 produces a first treated stormwater. The first treated stormwater permeates the second filter layer 22 to produce a second treated stormwater. The second filter layer 22 comprises 14 inches of crushed chemically configured concrete the main component of which is CaO. As used herein chemically configured means providing a crushed concrete composition comprised of CaO in an amount sufficient to raise the pH level of the second filter layer within the range of about 9 and 11 to induce chemical precipitation reactions of substantially all of the dissolved contaminants remaining in the first treated stormwater as the first treated stormwater permeates through the second filter layer.

A 14-inch coarse gravel filter bed 24 is positioned on the bottom of the housing 12 and is necessary to support the second filter layer above it and allows for trapping of any grit materials before the second treated stormwater is finally discharged through the second aperture 16 into an outlet pipe 32.

A separator layer 20 separates the first and second filter layers 18, 22 in order to prevent mixing of the materials that comprise the first and second filter layers 18, 22. The separator layer 20 is preferably comprised of a geosynthetic material having a width of approximately 6 inches. Selection of an appropriate geosynthetic material is based on its porosity and permeability in relation to the grain size of the filter media.

The entire filter material is embedded in a casing of a size that is appropriate in its structural dimensions to hold the weight and resist earth pressures. Since the system will be underground it also has to be covered allowing an air pocket for the water to flow through the inlet pipe into the filtration unit.

The final design of the system is customized based on local rainfall distribution patterns, average intensity and influent and effluent water quality. The housing 12 allows an easy exchange of the unit when maintenance is required. A sampling port 26 is located at the bottom of the housing 12 allowing for frequent testing of the effluent water in order to determine the time when maintenance becomes necessary.

Figure 3:
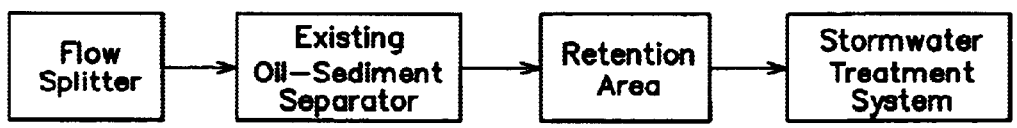
FIG. 3 is a schematic of the treatment train approach upstream of the stormwater treatment system.

It should be apparent to one skilled in the art the stormwater treatment system herein described can be adapted to attach downstream of existing second generation oil/sediment separators. (FIG. 3)

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

What is claimed is:

1. A stormwater treatment system which comprises:
    a housing having a first aperture positioned downstream of a second aperture;
    a first filter layer and a second filter layer comprised of crushed concrete comprising CaO positioned within the housing; and
    a separator layer disposed between the first filter layer and the second filter layer, the first filter layer absorbing contaminants from stormwater to produce a first treated stormwater and the second filter layer having a controlled pH within a range of between about 9–11 to precipitate substantially all of the dissolved contaminants remaining in the first treated stormwater when the stormwater flows into the first aperture, permeates through the first filter layer, the separator layer and the second filter layer and flows out of the second aperture.

2. The stormwater treatment system of claim 1 wherein the first filter layer is comprised of granular activated carbon.

3. The stormwater treatment system of claim 1 wherein the crushed concrete is chemically configured to induce chemical precipitation reactions of substantially all of the dissolved contaminants remaining in the first treated stormwater.

4. The stormwater treatment system of claim 3 wherein the separator is comprised of a geosynthetic material.

5. The stormwater treatment system of claim 4 wherein the contaminants are selected from the group consisting of phosphorous, cadmium, chromium, copper, lead and zinc.

6. The stormwater treatment system of claim 5 which further comprises:
    a gravel filter bed positioned on the bottom of the housing.

7. The stormwater treatment system of claim 6 wherein the housing is cement and further comprises a casing, the casing having a sampling port.

8. A method for treating stormwater runoff which comprises:
    permeating the stormwater through a first medium to produce a first treated stormwater; and
    flowing the first treated stormwater through a second medium comprised of crushed concrete having a pH within a range of between about 9–11 to precipitate substantially all of the dissolved contaminants remaining in the first treated stormwater.

9. The method according to claim 8 which further comprises flowing the first treated stormwater through a geosynthetic filter material.

10. The method according to claim 9 wherein the first medium is comprised of granular activated carbon.

* * * * *